United States Patent [19]

Guglielmetti et al.

[11] Patent Number: 4,772,006

[45] Date of Patent: Sep. 20, 1988

[54] PROCESS AND DEVICE FOR THE GRIPPING, TRANSFER AND PLACEMENT OF A SHEET OF FLEXIBLE PLASTIC MATERIAL

[75] Inventors: Giorgio Guglielmetti, Mondovi'; Guido Carossio; Luigi Gilli, both of Turin, all of Italy

[73] Assignee: Saint-Gobain Vitrage (Les Miroirs), Courbevoie, France

[21] Appl. No.: 889,192

[22] Filed: Jul. 25, 1986

[30] Foreign Application Priority Data

Jul. 25, 1985 [FR] France ............................... 85 11377

[51] Int. Cl.[4] ............................................. B65H 3/08

[52] U.S. Cl. ..................................... 271/11; 271/106; 271/107

[58] Field of Search .................... 271/90, 107, 106, 11

[56] References Cited

U.S. PATENT DOCUMENTS

| | | | |
|---|---|---|---|
| 3,275,317 | 9/1966 | Fromm | 271/106 |
| 3,314,676 | 4/1967 | Fromm | 271/106 |

*Primary Examiner*—Richard A. Schacher

*Attorney, Agent, or Firm*—Oblon, Fisher, Spivak, McClelland & Maier

[57] ABSTRACT

The invention pertains to a process and device for the gripping at a storage station, transfer and placement of a sheet of flexible plastic material at the stacking station in an automatic production process for compound structures, especially compound panes. In accordance with the process, the sheet made of flexible plastic material is grasped by suction connected to a swinging stamp, first exerting suction on the median part of the sheet, while extending this suction progressively up to one end of the sheet, then by swinging back, extending said suction over the entire surface thereof, while the sheet is simultaneously placed flush on its support, generally the subjacent sheet.

7 Claims, 3 Drawing Sheets

16 24 24 31 13 28 32 66 67 33 79 78 77 76 77 29 60 61 72 43 74 4 52 56 62 68 69 65 63 59 51 55 54 50 58 64 2 57 53

PROCESS AND DEVICE FOR THE GRIPPING, TRANSFER AND PLACEMENT OF A SHEET OF FLEXIBLE PLASTIC MATERIAL

BACKGROUND OF THE INVENTION

1. Field of the Invention

This invention pertains to the production of layered structures such as compound panes.

2. Related Art

Compound panes used in construction and in transportation vehicles, especially as windshields, are generally formed of at least one rigid sheet such as a sheet of glass or plastic material like polycarbonate or polymethacrylate of methyl, and of at least one sheet of a more flexible plastic material, such as polyvinylbutyral or polyurethane, for example, generally utilized as an intermediate sheet in the case of a structure comprising two rigid sheets.

To produce these compound panes, one cuts the sheets of flexible plastic material beforehand to the exact size and shape of the pane or to a slightly larger geometric format to form a primitive. The primitives are stacked with the other constituent elements of the compound pane and all of these elements are put together during an assembly operation which is generally performed in two stages: a first stage consisting, for example, of a calendering process providing a preliminary assembly, followed by a second stage consisting of a pressure sealing stage, in which high temperature and pressure are used to form the final assembly The invention pertains more specifically to the stacking of the flexible sheet with the other constituent elements of the compound pane and the operations related thereto, especially the gripping of the flexible plastic sheet at a storage station near the stacking station, the transferral thereof to the stacking station and the placement thereof in the correct position in the stacked formation.

One of the problems which is encountered in the automation of the various operations utilized for the production of compound panes is the gripping of the sheet made of plastic material at the storage station and its correct positioning in the stacked formation forming the pane. Indeed, sheets made of plastic material such as polyvinylbutyral or polyurethane tend to stick together to a certain degree when exposed to the surrounding temperatures present in a factory and when they are stacked together which is generally the case at the storage station. For the gripping of the sheet, it commonly occurs that when the top sheet on the pile is gripped, the sheet subjacent thereto is also taken, essentially adhering to the former. This phenomenon is particularly troublesome when the sheets are placed at a fixed and specific location, which is the case in an automated assembly process in which the sheet is intended to be gripped in a specific place and transferred over a path having a constant length to the station where the compound pane is stacked. As a result, if the pane were moved from its exact gripping position, it would subsequently be placed in an accordingly offset and thus incorrect position in the stacked formation.

SUMMARY OF THE INVENTION

The invention has as its object a process for the gripping of one sheet of flexible plastic material placed at the top of a pile of similar sheets at a gripping station, the transfer of the sheet to the stacking station for a compound structure such as a compound pane, and the placement of the sheet in the correct position in the stacked formation without the risk of accidental movement of the sheet itself or of a subjacent sheet when gripping occurs.

In accordance with the invention, the flexible plastic sheet is gripped by a curved suction part of a swinging stamp swinging about an axis substantially parallel to the axis of curvature of the stamp, with the suction being exerted initially on the median part of the sheet, and progressively extending over one side of the sheet. Then, by a return of the stamp, the suction is advanced over the entire sheet. The suctioned portion is lifted during the swinging of the stamp, while the remainder of the sheet remains flush on its support which is generally the subjacent sheet. Following the swinging stamp movement, the sheet is transferred and put into place at the stacking station.

The suction can be exerted at points distributed regularly over the entire surface of the sheet. In one variation, the suction can be limited to the entire sheet with the exception of the central section thereof, or it can be limited only ot the peripheral areas of the sheet. This variation can be utilized especially in the case in which large formats are gripped, i.e., primitives for wide automobile windshields, for example. The suction force can be variable and it can be determined easily according to the weight of the primitive to be grasped.

The invention also pertains tò a device for the implementation of the gripping process at a storage station, transfer and placement of the flexible plastic sheet at the stacking station in a production line for layered structures such as compound panes. It includes a gripping device, which can be set into an up-down motion. The gripping device is endowed with a suctioning swinging stamp, having a curved lower active surface, means to cause the swinging movement of the stamp and means to transfer the gripping device from the sheet gripping station to the station where the sheet is placed for stacking, with the lower surface of the stamp having openings such as holes allowing the sheet made of plastic material to be grasped by suction.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
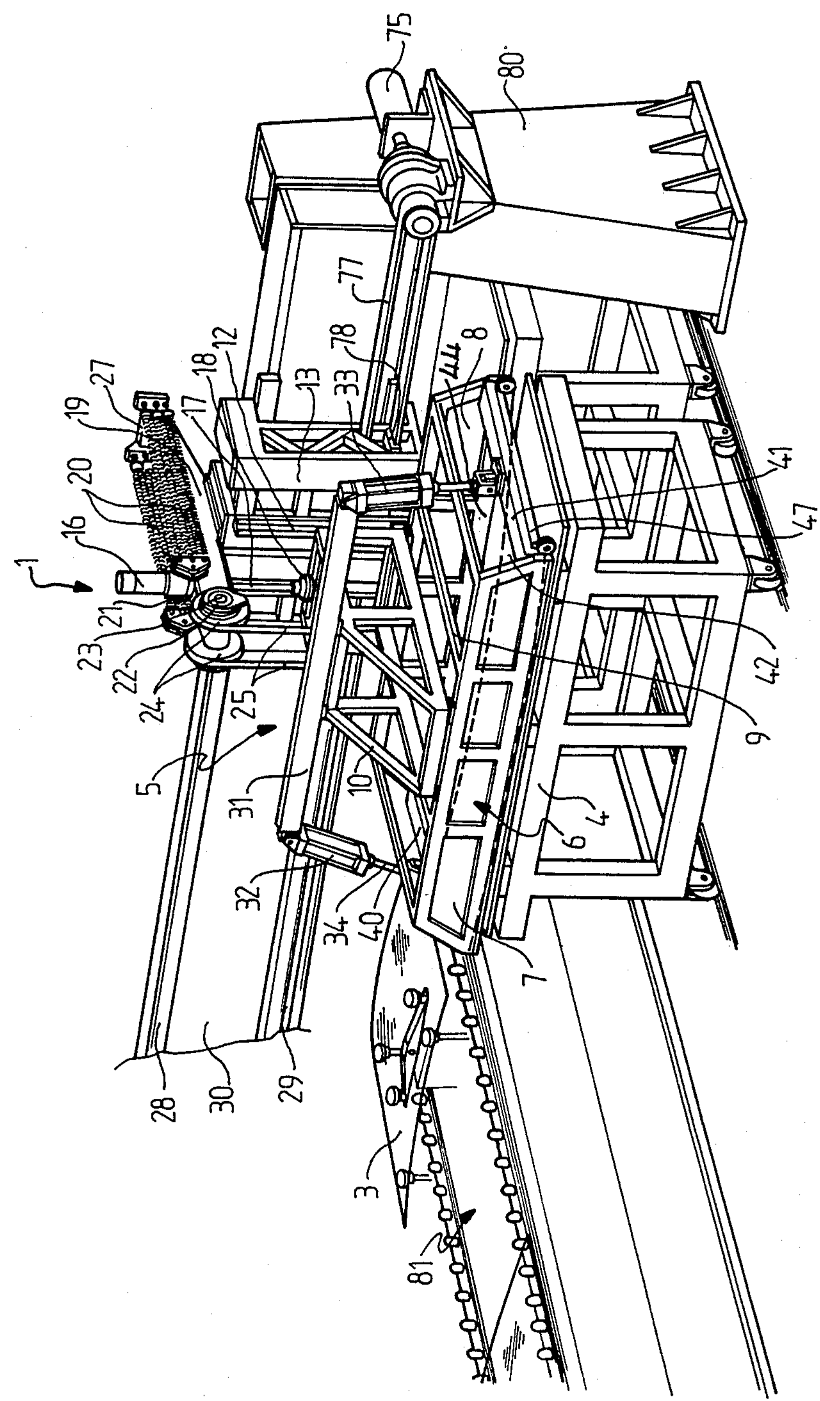
FIG. 1 is an orthogonal view of the gripping device.

FIG. 1 shows the entire gripping and transfer device 1 for the sheet made of flexible plastic material 2 at the gripping station located near the stacking station for the elements of the compound pane, where only one sheet of glass 3 is shown; the gripping device is shown in its lower position, i.e., in the position to grip the plastic sheet (not shown in this FIG. 1) placed on a table 4 at the gripping station.

Figure 2:
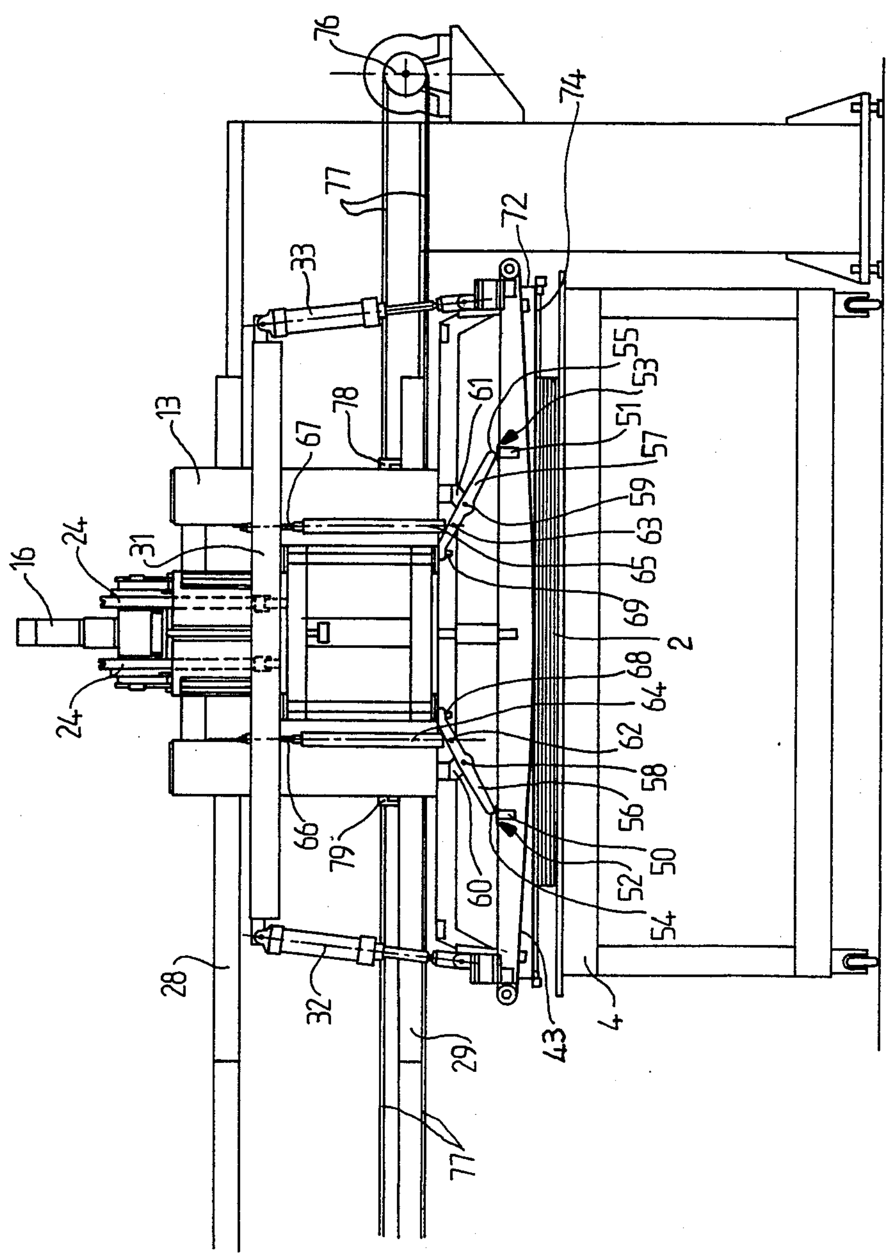
FIG. 2 is a more detailed front view of the device in FIG. 1 and of the pile of sheets standing by on the adjacent table.
Figure 3:
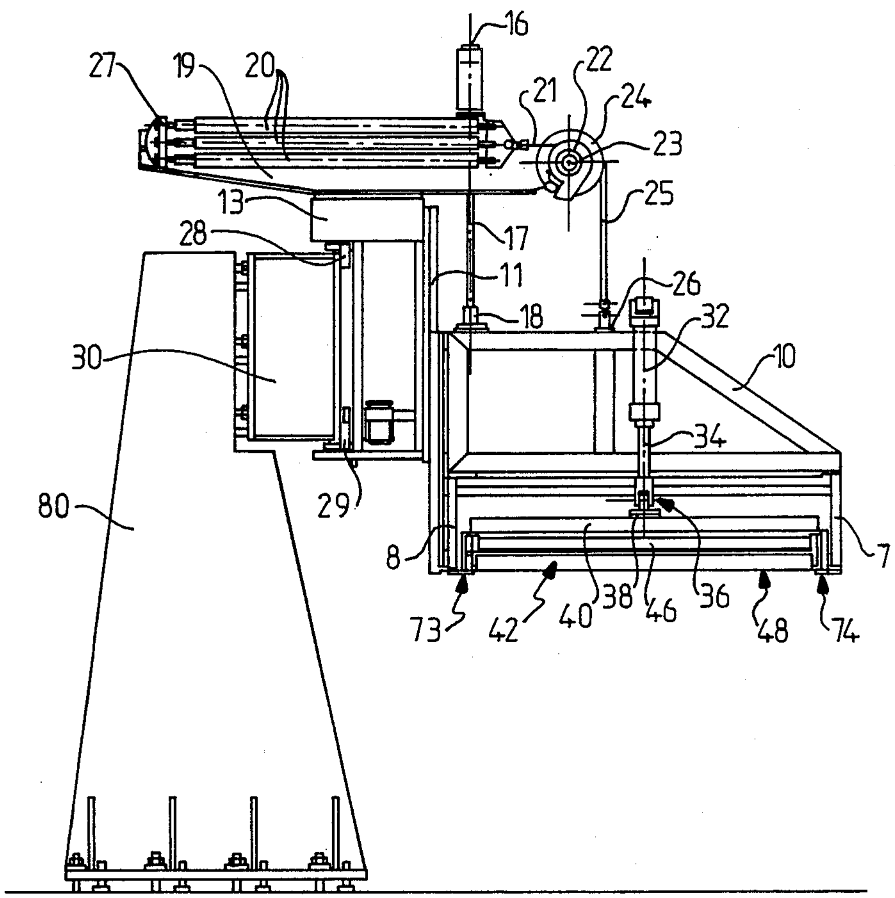
FIG. 3 is a partial side view, which does not include the table of the device in FIG. 2.

In FIGS. 1, 2 and 3, the gripping device 5 is formed of a cradle 6 having two longitudinal sides 7, 8 connected by cross pieces 9 in its upper part. The two sides 7, 8 jointly support a transverse portico 10 which is mounted at one of its two lateral ends on two vertical rails 11, 12, supported by a carriage 13. This assembly provides the entire gripping device 5 with the possibility of up-down movement. This movement is governed by a numerically-controlled motor 16 which causes a vertical screw 17 to rotate within a non-rotatable nut 18 connected to the portico 10. The motor 16 is mounted on a double bracket 19 borne by the carriage 13. The weight of the vertically movable gripping device 5 is compensated by the force o several horizontal springs 20, the movable ends of which are attached to two cables 21 which wind around two offset pulleys 22 supported by a common horizontal shaft 23 mounted at the end of the double transverse bracket 19. These offset pulleys 22 which compensate for the variation in force of the springs caused by the extension thereof, rotate together with two other pulleys 24 turning around a same shaft 23. Two vertical chains 25 wind around these pulleys 24, with the ends of the former being attached to a cross piece 26 of the portico 10. The opposite ends of the compensation springs 20 are attached to a vertical plate 27 which is mounted on the rear end of the double bracket 19. This assembly allows the weight of the gripping device to be offset at all points of its updown trajectory.

The carriage 13 can move on two horizontal rails 28, 29, held by a horizontal beam 30 placed perpendicular to the assembly line where the stacking of the various elements comprising the compound pane occurs. This carriage 11 transfers the sheet of plastic material taken by the gripping device 5 from the station where the sheet is gripped to the stacking station for the elements of the compound pane.

The portico 10 is overmounted by a horizontal beam 31, extending longitudinally in the median plane of the cradle 6. To each of the two ends of this beam is attached the body of a jack 32 or 33, whose rod end 34 or 35, is mounted via a shaft 36 or 37 held by a bearing 38 or 39 onto a cross piece 40 or 41 linked to a stamp 42 having a curved lower surface, with said stamp having a symmetry with respect to a transverse plane which is the same as that of the entire gripping device 5.

The stamp 42 is formed of a rigid metal structure including two side rails 43, 44 whose lower surfaces have a circular curvature, which are connected at their ends by cross pieces. These two cross pieces 46, 47 hold the aforementioned crosspieces 40, 41, which are screwed thereon.

The lower surface 48 of said stamp is formed of a sheet made of relatively rigid plastic material which is curved into a circular arc. Numerous holes are placed therein, allowing suction to be applied to the sheet to be grasped, as described below.

Figure 4:
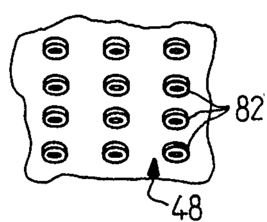
FIG. 4 is a partial view of the lower surface of the stamp of the gripping device shown in the previous figures.

Each hole is surrounded by an elastic foam washer 82 having a thickness of about 1 centimeter, as shown in FIG. 4. The number of holes can vary from one embodiment to another. For a stamp which is about 2 meters long by 80 centimeters wide, there can be about 400 holes, for example.

The plastic sheet forming the lower surface 48 of the stamp is attached to the lower surfaces of the side rails 43, 44, in a circular arc, which gives a cylindrical curved shape to the sheet of rigid plastic material forming the lower surface 48 of the stamp. Although fairly rigid, this sheet of plastic material must be able to conform to the desired curve.

The upper surface (not shown) of the stamp, made of a resin, fits flush with the shape of the intake conduits which are essentially two main longutidinal conduits (not shown), symmetrical with respect to the longitudinal plane of the stamp and numerous secondary transverse conduits, placed about 5 centimeters apart. These secondary conduits are placed in contact with the holes in the lower surface 48. The upper surface of the stamp is endowed with four openings (not shown), connecting the intake pipes to the two main longitudinal conduits.

Two cross pieces 50, 51, symmetrical with respect to the axial transverse plane of the stamp 42, support two small plates 52, 53, on which casters 54, 55 rest. The casters are attached at the ends of flanges 56, 57. The flanges pivot, at midpoint thereof, around shafts 58, 59, held by lugs 60, 61, which are also symmetrical with respect to the axial transverse plane of the stamp. Each flange also supports a shaft 62, 63, at a point located between a respective shaft 58 or 59 and the end opposite the end on which a caster is placed. To this shaft is attached the lower end of a vertical spring 64 or 65, fixed at its upper end to the end of a vertical rod 66 or 67 screwed to the horizontal beam 31. The end of the flanges 56, 57 opposite the end on which a caster is attached has a small rod 68, 69, which, when the stamp is in horizontal position due to the action of the springs 64, 65, stops against the lower surface of the portico 10.

To each end of the two cross pieces 46, 47 of the stamp is attached a compound spring 72, the other end of which is fastened to a block 73, 74 connected to the longitudinal sides 7, 8 of the cradle. These four compound springs hold the stamp in its central equilibrium position.

This system of flanges and springs holds the stamp against the pile of primitives during the stamping operation; it causes the stamp to bend, thus reducing the curve thereof during the stamping operation.

A proximity detector (not shown) is placed on the cradle, with this detector passing through the stamp for detecting the position of the primitive 2 to be grasped on top of the pile, and which retracts into the stamp on contact with said primitive.

In the gripping position, the device is located perpendicular to the table 4 holding the primitives 2 which are stacked in a regular manner. Several gripping positions can be provided during a production process for compound panes. To each of these positions corresponds a table (not shown) holding a pile of primitives, which are identical or different depending on whether one or two types of compound panes are being produced. The gripping positions are well-defined and the movement of the gripping device along the rails 28, 29 can be adjusted accordingly.

The carriage 13 slides on the rails, moving on an air cushion provided by means which are not shown. The carriage is moved by a numerically controlled motor 75 held by the frame 80, which moves a toothed wheel 76 which meshes with a synchronous belt 77. One of the ends 78 of the belt 77 is attached to one side of the carriage 13 while the other end 79 is attached to the other side of the carriage, after the return of the belt around a pulley (not shown) placed at the other side of the beam 30.

The operation of the device is now described in relation to the production of a compound pane formed of two sheets of glass and an intermediary sheet made of polyvinylbutyral, and more specifically in relation to the production phase consisting of making the stack formation of the primitive with the two glass sheets. The overall sequence of operations is controlled by an electronic processor.

While the two sheets of glass arrive by conveyor 81 at the stacking station and are placed in the correct position for the stacking operation, the gripping and transfer device 1 for the flexible plastic sheet primitives 2 serving as the intermediary layer according to the invention arrives perpendicular to a table 4 holding a pile of appropriate primitives 2. The position perpendicular to the table is determined in advance. The gripping device 5, i.e., the part which can be set into up-down movement, is lowered by the activation of the motor 16 controlling the vertical screw 17 turning in the nut 18 until the proximity detector senses the presence of the top primitive 2 on the pile. At this time, the detector retracts into the stamp and the device 5 continues to lower until the washers 82 lining the median area of the lower surface 48 of the stamp 42 arrive in contact with a median part of the primitive 2. The suction is then activated, being exerted on the primitive where the washers are placed; simultaneously, the stamp 42 is set into a swinging motion about its transverse axial plane due to the action of the jacks 32, 33, which brings it progressively up to one end of the primitive, then by a return motion, up to the other end. The movement is balanced by the double system of flanges and springs. During this swinging movement which is accompanied by the pressing of the longitudinal sides of the stamp on the blocks 73, 74 of the cradle, the primitive 2 is taken up gradually as contact is established by the stamp through the intermediary of the washers 82 with which its lower surface 48 is endowed. Upon completion of the return movement of the stamp, the primitive is grasped completely by the former, i.e., at that time, it undergoes suction distributed over the entire surfaces thereof corresponding to the holes placed on the lower surface 48.

When the top primitive 2 is grasped, the remaining pile of primitives is kept in the gripping position by the stamp. The gripping motion never affects the position of the other primitives, which are still held on the table by the stamp which always presses on the pile of primitives during the swinging motion. When the swinging motion is completed and the primitive is grasped over its entire surface, the gripping device is raised by the action of the motor 16. Then the assembly is taken by the carriage 13, which is pulled by the belt 77 moved by the motor 75, along the horizontal rails 28, 29 up to the stacking station. At this station, the first sheet of glass 3 is already in a stacking position. The other sheet of glass (not shown) is on standby in a position out of the path on which the gripping and transfer device for the primitive runs. The gripping device is then lowered by the action of the motor 16 to the immediate proximity of the glass sheet 3 and the primitive is placed on the horizontally positioned glass sheet 3 by cutting off of suction. Next, the gripping and transfer device is removed and brought back to the gripping station or a similar station where it will grasp another primitive for another assembly operation. During this time, the second glass sheet (not shown) is brought, using an additional device, with which it is placed on the primitive which has already been positioned to thus complete the stacking formation which is next brought to the subsequent automatic assembly station.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for gripping and transferring a sheet of flexible plastic material from a pile of sheets in a gripping station to a production station, comprising:

a stamp having a curved lower surface including suction means therein to form a gripping device symmetric with respect to a plane transverse thereto;

means for vertically moving said stamp such that said lower surface can press on a top sheet of said pile of sheets in said gripping station;

jack means for sequentially swinging said stamp in two directions about an axis substantially parallel to the axis of said curved lower surface while maintaining at least a portion of said lower surface pressed against said stack, whereby the entirety of said top sheet is gripped by said stamp;

means for moving said stamp from said stack to said production station;

a cradle having blocks on which rest longitudinal sides of said stamp during said swinging movement; and springs connected between said stamp and said blocks for maintaining a horizontal equilibrium position of said stamp.

2. The apparatus of claim 1 wherein said suction means comprise:

holes in said lower surface; and means for communicating said holes with a source of suction.

3. The apparatus of claim 2 wherein said means for vertically moving comprise a numerically controlled motor.

4. The apparatus of claim 2 including spring means suspending said stamp for compensation for the weight thereof.

5. The apparatus of claim 2 wherein said means for moving said stamp comprise a carriage governed by a numerically controlled motor.

6. The apparatus of claim 5 including an electronic processor for controlling said motor.

7. The apparatus of claim 2, wherein said suction means further comprise elastic washers surrounding each of said holed at said lower surface.

* * * * *